United States Patent

[11] 3,596,514

| [72] | Inventors | Wayne S. Mefferd<br>Palo Alto;<br>Robert J. Rorden, Los Altos; James L. Hobart, Palo Alto, all of, Calif. |
|---|---|---|
| [21] | Appl. No. | 695,160 |
| [22] | Filed | Jan. 2, 1968 |
| [45] | Patented | Aug. 3, 1971 |
| [73] | Assignee | Coherent Radiation Laboratories, Inc.<br>Palo Alto, Calif. |

[54] POWER METER FOR MEASUREMENT OF RADIATION
6 Claims, 12 Drawing Figs.

[52] U.S. Cl. ................................................. 73/190,
73/359, 136/213, 250/83.3
[51] Int. Cl. ....................................................... G01k 17/00
[50] Field of Search .......................................... 73/190,
355, 341, 359; 136/213, 224; 250/83.3

[56] References Cited
UNITED STATES PATENTS

| 2,573,596 | 10/1951 | Offner | 73/359 |
|---|---|---|---|
| 2,755,999 | 7/1956 | Vickers | 236/69 |
| 1,988,858 | 1/1935 | Quereau | 73/355 |
| 3,194,071 | 7/1965 | Hager, Jr. | 73/341 |
| 3,232,113 | 2/1966 | Malone | 73/355 |
| 3,280,626 | 10/1966 | Stempel | 73/190 |
| 3,348,047 | 10/1967 | Clifford | 73/355 |
| 3,424,624 | 1/1969 | Villers et al. | 136/213 |
| 3,285,069 | 11/1966 | Weiss | 73/355 |

OTHER REFERENCES

Gordon " An Instrument for the Direct Measurement of Intense Thermal Radiation" In Review of Scientific Instruments Vol. 24 #5 May. 1953. pg. 366–370.

*Primary Examiner*—James J. Gill
*Assistant Examiner*—Herbert Goldstein
*Attorney*—Limbach, Limbach & Sutton ABSTRACT: A power meter for measuring radiation including a radiation target disc, a heat sink for cooling the periphery of the disc, and a circumferentially extending array of radial thermocouples for measuring the total power of energy incident on the central area of the disc as a function of the sum of radial temperature gradients of the disc.

3,596,514

INVENTORS
WAYNE S. MEFFERD
ROBERT J. RORDEN
JAMES L. HOBART
BY Naylor & Neal
ATTORNEYS INVENTORS
WAYNE S. MEFFERD
ROBERT J. RORDEN
JAMES L. HOBART
BY Naylor & Neal
ATTORNEYS

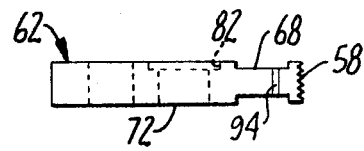
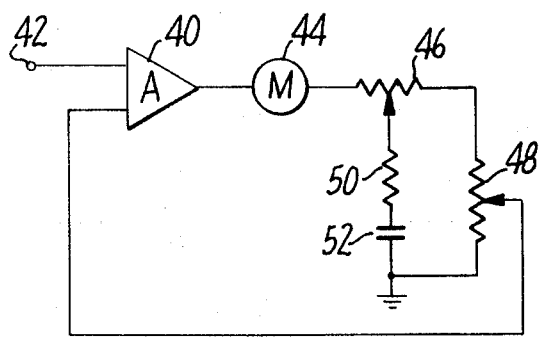
FIG. 8.
FIG. 10.
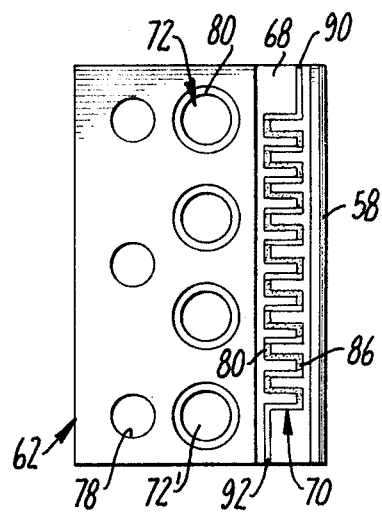
FIG. 11.
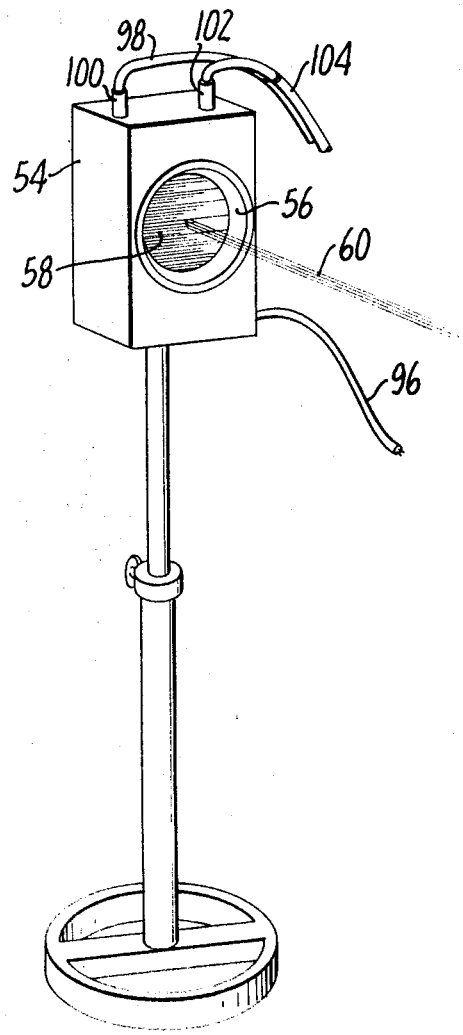
FIG. 9.
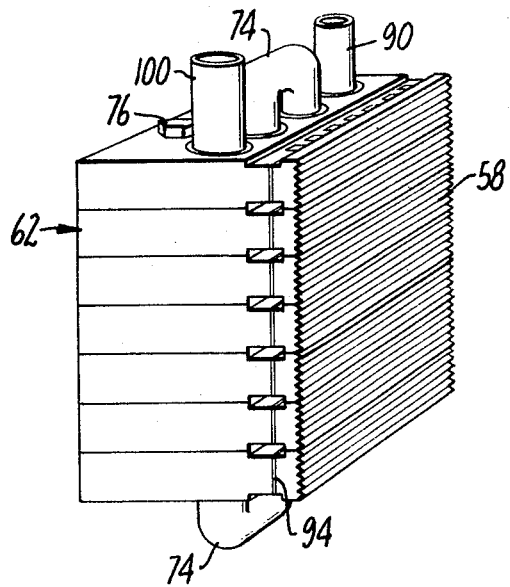
FIG. 12.
INVENTORS
WAYNE S. MEFFERD
BY ROBERT J. RORDEN
JAMES L. HOBART
Naylor & Neal
ATTORNEYS

POWER METER FOR MEASUREMENT OF RADIATION

This invention relates to an efficient and accurate device for measuring high intensity radiation.

Since the development of the laser and similar devices for amplification of electromagnetic waves in additional regions of the spectrum, the problem of measuring intense radiation has become more acute. The overall object of the invention is to provide a convenient but accurate device for measuring high intensity radiation of all wavelengths by employing a highly efficient radiation receiver and a novel arrangement of thermocouples to permit instant measurement with a minimum of adjustment.

A more specific object of the invention is to provide a thermopile arrangement that will produce an accurate measurement of incident radiation although the heat intensity source may impinge at indiscriminate positions in a selected target area.

An additional object of the invention is to increase the absorption coefficient of a surface receiving incident radiation by reducing the quantum of escaping reflected radiation.

Additionally, it is an object of this invention to combine a thermopile pyrometer and a radiation receiver into a single compact unit of such design as to preclude operational failures.

The above and additional objects and advantages will become apparent upon full consideration of the preferred embodiment of the invention disclosed in the following specification and accompanying drawings in which:

FIG. 8 is a schematic diagram of the basic circuitry in the readout device;

FIG. 9 is a perspective view of a modified form of a principal element in the apparatus invented;

FIG. 10 is a view in side elevation of one plate of the plate stack in the structure of FIGS. 9—12;

FIG. 11 is a plan view of the plate illustrated in FIG. 10; and,

FIG. 12 is a perspective view of the plate stack of the apparatus of FIG. 9.

Figure 1:
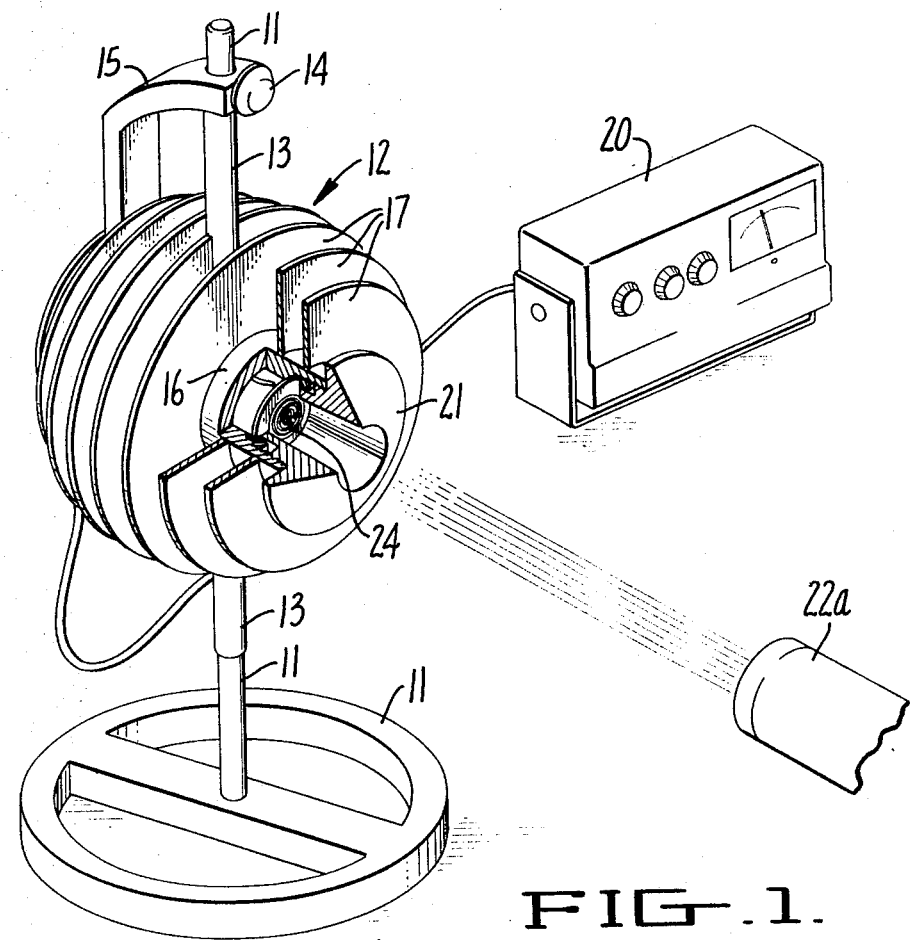
FIG. 1 is a perspective view, partially in section, of the preferred form of apparatus of this invention.
Figure 2:
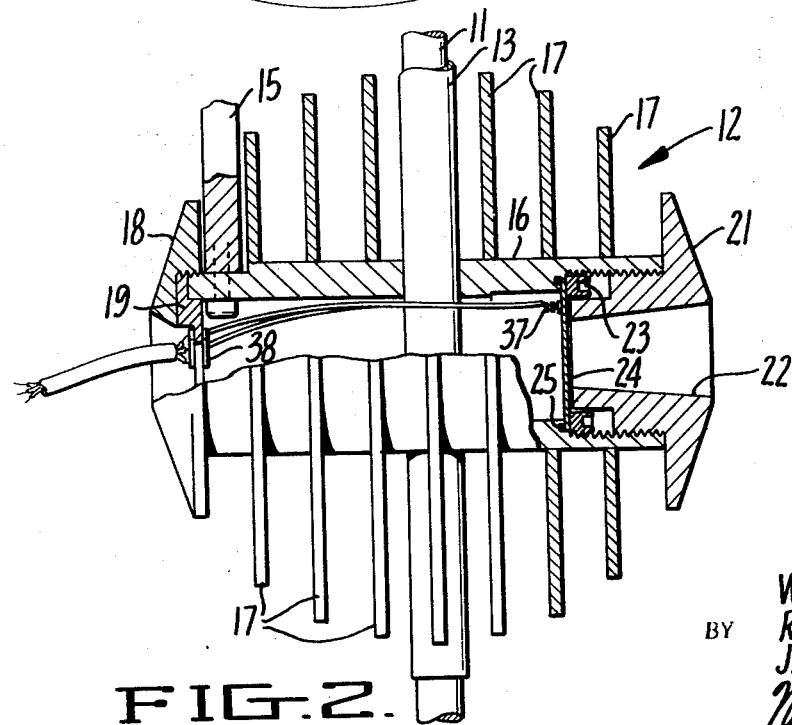
FIG. 2 is a view in side elevation, and partially in section, of a portion of the apparatus of FIG. 1.

Referring now in detail to FIGS. 1 and 2, the preferred form of the invention comprises an upright support stand 11 on which is mounted an annular cooling body 12. The annular cooling body 12 fixed to a sleeve 13 is free to move vertically and circumferentially along the vertical axis of the stand 11, and may be locked in place by a thumbscrew 14. The thumbscrew 14 is threaded through the end of a support 15, which may also function as a handle, and passes through the sleeve 13 to lock on the stand 11.

The annular cooling body 12 is constructed of a suitable material of high thermal conductivity, here aluminum, and is comprised of an inner, hollow, cylindrical core 16, hereinafter called the inner core, on which circular, disc-shaped, cooling vanes 17 are concentrically fixed. The vanes 17 vary in diameter according to their position on the inner core 16 such that they outline the shape of a sphere. The sleeve 13 passes through the center of the annular cooling body 12 perpendicular to the axis of the inner core 16.

An end vane 18 contains a dielectric coated disc 19 with electrical terminals 38 to which a readout device 20 is electrically connected. The vanes 17 are preferably attached to the inner core 16 by shrink fit or weld, and the end vane 18 is preferably threaded onto the end of inner core 16.

On the opposite end of the inner core 16, a threaded cap 21 forms a guide aperture 22 for direction of radiation from source 22a such as a laser. The cap 21 is externally threaded and received by the inner core 16 which has been reamed and threaded to a depth of approximately one-quarter of its entire length. Also threaded into the inner core is a metal retainer ring 23, more clearly represented in FIG. 3.

Figure 3:
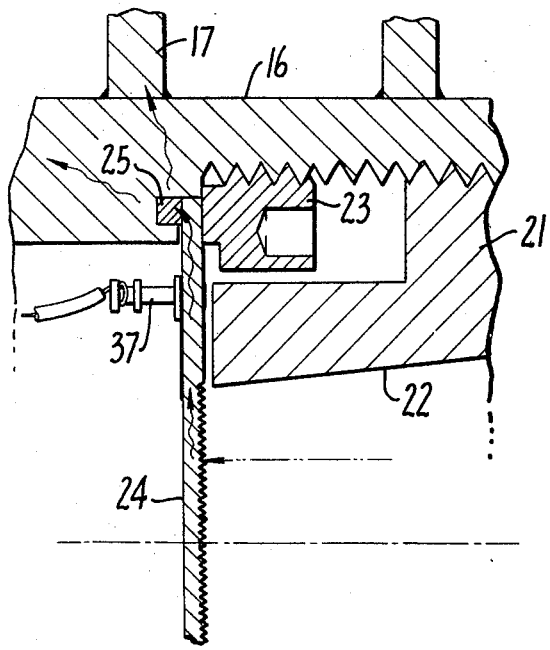
FIG. 3 is a sectional view on a larger scale showing a portion of the structure of FIG. 2.
Figure 4:
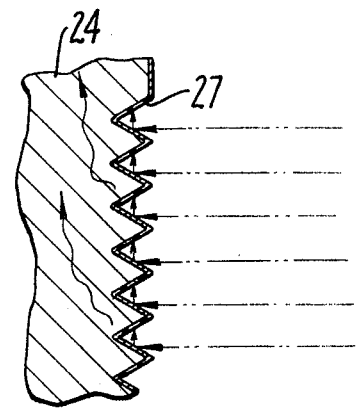
FIG. 4 is a sectional view on a larger scale showing a portion of the structure of FIG. 3.

Turning now to FIGS. 3 and 4, it is seen that the retainer ring 23 holds a disc 24 firmly against a shoulder 16a of the inner core 16. To increase the thermal conductance of the contact, a soft metal seal 25, here a band of indium solder, is inserted between the disc 24 and the inner core 16.

Figure 5:
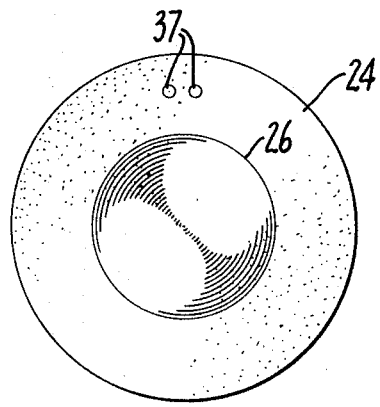
FIG. 5 is a front view of the target disc used in the apparatus of FIGS. 1—4.

The disc 24 is constructed of aluminum or other suitable thermoconductive material. The disc is preferably made with a high thermal conductivity to transfer absorbed energy to the cooling body 12 rapidly, but the disc may be made of lower thermal conductivity materials such as asbestos or ceramics which provide a minimum heat transfer from the center of the disc to its periphery. The side of the disc 24 facing the radiation source 22a will be designated the face, illustrated in FIG. 5, and the opposite side, the back, illustrated in FIG. 6. A circular surface area 26 exposed to incident radiation (hereinafter also referred to as the "exposed surface"), preferably carries a series of generally circular V-grooves as shown in FIGS. 3, 4 and 5, to increase its efficiency as a radiation receiver. The grooves may be stamped or spirally cut.

If incident radiation is normal to a smooth surface, part of the radiation will be reflected back upon itself and lost. The grooving of the exposed surface 26 enables the radiation not absorbed to be reflected into the opposite wall of the groove as indicated in FIG. 4. Though the absorptive coefficient of a material for radiation incident normal to the surface is greater than when incident at an angle, the double opportunity of a grooved surface to absorb radiation, once on initial incidence and then again on reflected incidence, makes the overall absorption greater than if the surface were smooth. The groove angle that has been found to be of maximum efficiency is 60°, and is the angle illustrated in FIG. 4.

The exposed surface 26 of the aluminum disc 24 is black anodized as indicated by numeral 27 in FIG. 4.

Figure 6:
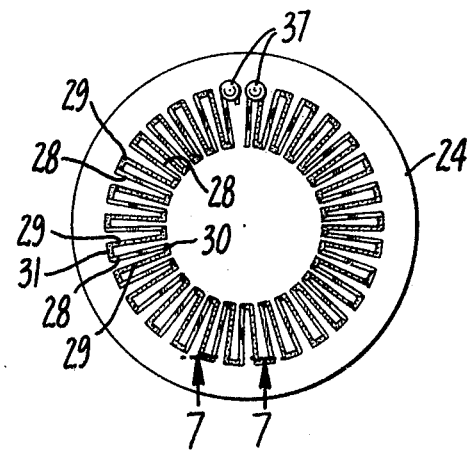
FIG. 6 is a rear view of the disc shown in FIG. 5.
Figure 7:
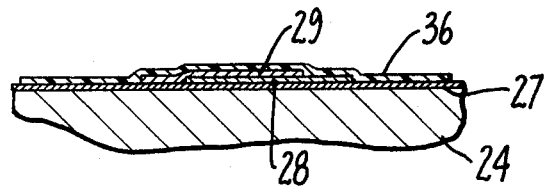
FIG. 7 is a view in section of a portion of the disc of FIG. 6 taken along the plane 707 of FIG. 6.

The back of the disc 24, represented in FIG. 6 and in partial section in FIG. 7, is also anodized to give a dielectric surface. Thermocouples are then arranged on this face of the disc 24 in a circular pattern, as shown in FIG. 6, forming a thermopile. This thermopile is constructed by a plurality of first electrical conductors, exemplar shown by numeral 28 in FIG. 6, formed of a first metal, here a vapor deposit of gold or silver, with each of said conductors being a single continuous piece of metal having a first end portion, exemplar 30, and a second end portion, exemplar 31. Said first end portion 30 is mounted on the disc 24 and positioned on the periphery of a first circle which is concentric with the disc 24. Said second end portion 31 is mounted on the disc 24 and positioned on the periphery of a second circle, which is concentric with the disc 24 and substantially larger than said first circle. A plurality of second electrical conductors, exemplar shown by numeral 29 in FIG. 6, formed of single continuous pieces of a second metal different from said first metal, here a vapor deposit of bismuth, are each electrically connected between one of said first end portions, exemplar 30, of a said first conductor, exemplar 28, and a second end portion 29 of a different, but adjacent first conductor.

The manner of electrical connection is shown in FIG. 7, which is a partial section at the outer circle connection taken along the plane 7-7 of the disc 24 in FIG. 6. A vapor deposit of gold 28 is placed on an anodized surface 27 of the disc 24. A vapor deposit of bismuth 29 overlaps the deposit of gold 28 to form an electrical connection. The entire back of the disc 24 is then coated with a protective coating 36. The gold first conductors and the bismuth second conductors are alternately linked in electrical series.

Referring to FIGS. 3, 5, and 6, it will be seen that the second or outer circle of gold and bismuth electrical connections lies on the back of disc 24 and is outside the area behind the exposed surface 26 of the disc. The outer circle lies within inner core 16 and cooling vanes 17 of the annular cooling body 12.

Two electrical output leads 37, also shown in FIGS. 2 and 3, are connected to opposite ends of the electrical series, said ends formed by creating a break in one link 34 of the electrical series as shown in FIG. 6. The two electrical output leads 37 are electrically wired to the terminals 38 on the dielectric retainer ring 19, as shown in FIG. 2, for electrical connection to input leads of the readout device 20, FIG. 1.

Turning again to FIGS. 1 and 2, thermal radiation from a source, such as that indicated by numeral 22a, strikes the disc 24 at some point on the exposed surface 26, FIG. 5, and is absorbed, heating the disc 24. The cap 21 does not contact the disc 24 and hence does not cool it directly. The thermocouples on the periphery of the outer circle, hereinbefore designated as the second circle, are maintained substantially at the temperature of the cooling body 12 because of their close proximity with the annular cooling body 12, which drains the heat through conductance as indicated by the conduction paths represented by wavy arrows shown in FIGS. 3 and 4. All the thermocouples in this second circle remain at substantially the same temperature due to the radial design of the annular cooling body 12 with both its cylindrical shaped inner core 16 and its disc-shaped vanes 17 concentric with the thermopile arrangement.

The thermocouples in the inner circle, hereinbefore designated as the first circle, become highly heated in direct proportion to the intensity of incident radiation. The temperature of each thermocouple will vary according to the distance from the particular point of impingement of the radiation on the exposed surface 26. Each thermocouple develops an electromotive force in approximate proportion to its temperature. As the thermocouples on the periphery of the first circle are at substantially higher temperature than those on the periphery of the second circle, the oppositely directed electromotive force developed by the slightly heated thermocouples on the second circle is overcome leaving a net gain for each pair of thermocouples in a link As all the thermocouple links are connected in electrical series, the gain is summed in the thermopile arrangement developing an output electromotive force at the output leads 37 which is the sum of all of the electromotive forces developed in different radial directions. The particular arrangement of the thermopile shown in FIG. 6 has two principal advantages: it develops an amplified output signal at the output leads 37; and, it develops the same total gain or output-terminal electromotive force, regardless of where in the exposed surface 26, FIG. 5, the radiation source impinges.

As illustrated in FIG. 8, the readout device 20 includes a differential amplifier 40 with an input terminal 42 connected to one of the electrical terminals 38 of FIG. 2, the other terminal 38 being grounded. The output of amplifier 40 passes through a meter 44 and potentiometers 46 and 48 to ground. Potentiometer 48 is coupled to the other input of the differential amplifier to permit adjustment of the power range of the meter by adjustment of the load potentiometer 48.

A resistor 50 and capacitor 52 are connected between the potentiometer 46 and ground as illustrated. This resistance-capacitance circuit provides an electrical analog of the time delays of the heating in the target disc 24 so that substantially instantaneous readouts are obtained on the meter 44 before thermal equilibrium is established in the disc.

Thus, the approach toward thermal equilibrium in the target disc 24 causes a progressive voltage change at input terminal 42 which is anticipated by the time constant of RC circuit including capacitor 52, resistance 50 and the portion of the resistance of potentiometer 46 between capacitor 52 and meter 44. When the readout device is initially assembled with the remainder of the equipment, potentiometer 46 is adjusted to regulate this time constant so that compensation added to the meter output by the RC circuit causes the meter to overshoot an equilibrium reading as little as possible with the result that a normal six second delay before accurate meter reading is reduced to less than one second.

This readout device with its built-in electrical analog may be used in other devices which involve a time lag before the establishment of an equilibrium condition to be measured. The readout device is particularly useful in thermopile power meters and has been used successfully without change in a modified form of power meter designed for power measurement of high power lasers.

Since the heat developed by lasers with high power outputs is sufficient to damage the disc 24 of the air cooled power meter previously described, a water cooled modification shown in FIG. 9 has been developed. Essentially a boxlike container 54 with a circular guide aperture 56 exposes a V-grooved surface 58 to incident radiation 60. Unlike the disc 24 in the annular cooling body 12 of FIG. 1, the V-grooved surface 58 is comprised of a plurality of flat plates, all similar to the plate 62 shown in FIGS. 10 and 11, bolted in a plate stack 64 as shown in FIG. 12. Each plate 62 has a cross section as shown in FIG. 10, with a V-grooved front surface 58 for exposure to radiation, a wide slot 68 on top and bottom face of the plate 62, a thermopile 70 mounted in said wide slots 68, and a waterjacket 72 formed by four holes 72 in each plate 62 which are connected to four complimentary holes in an adjacent plate. When the plates 62 are stacked in the manner illustrated in FIG. 12 the conduits formed are interconnected by manifold members 74 such that a circulatory passageway is created. The plates 62 are fastened together by bolts 76 through bolt holes 78, and the waterjacket 72 is adequately sealed by placement of annular sealing washers 80, of greater thickness than the depth of seating 82 provided, between each of the plates 62.

The temperature gradient is her not radial as in the disc 24, but is a direction normal to the exposed surface 58. The thermopile 70 of each plate 62 is formed by a plurality of thermocouples of two dissimilar metals and is constructed in the manner described for the disc 24 of FIG. 1. However, instead of being arranged in a circular pattern, they are arranged in a straight line, illustrated in FIG. 11 with one set of thermocouples, exemplar 86, close to the heated exposed surface 64 and the other set of thermocouples, exemplar 88, mounted at a distance from the exposed surface and cooled to a greater extent by the internally situated waterjacket 72. The thermopile end 90 is connected in electrical series to the end of a thermopile on an adjacent plate in the plate stack 64. The opposite end 92 is electrically connected 94, FIG. 12, to the thermopile on the reverse side of the plate 62. The cumulative effect of the arrangement of thermocouples when the plates 62 are stacked in the manner illustrated in FIG. 12 is that of a sensing grid. The area permitted to be exposed by the guide aperture 56 is backed by a uniform arrangement of thermocouples in which one set, exemplar 86, forms a grid close to the exposed surface 58 and the other set, exemplar 88, forms a grid at a distance from the surface 58 and removed from the first set by approximately one-half inch. Since a temperature gradient exists between the first and second set, a resultant electromotive force is developed by the series connected thermocouples. This electromotive force is transmitted from the power meter to a readout device 20 such as that illustrated in FIGS. 1 and 8, by a cable 96, FIG. 9, connected to the ultimate ends of the thermopiles in the plate stack 64. Again, the absorptive coefficient of the exposed surface 58 is increased by V-grooving.

The waterjacket is supplied by an input hose 98 from a water source connected to an input connection 100. The water or other liquid coolant is circulated through the plate stack 63 and expelled through an output connection 102 and output hose 104.

The composite device invented constitutes an efficient power meter measuring the intensity of incident radiation on an exposed surface. This power meter may be used in combination with a simple potentiometer to measure output electromotive force, once the system has reached the state of equilibrium, but it is preferably used in combination with a more sophisticated readout device with an electrical analog of time delay for obtaining instantaneous measurement of radiation intensity.

What we claim is:

1. A power meter for measuring radiant energy which comprises: an annular cooling body having an inner hollow cylindrical core portion constructed of a material of high thermal conductivity, a plurality of circular disc-shaped, outer cooling vanes concentrically fixed on the inner core portion and constructed of a material of high thermal conductivity, an interior axially facing shoulder on the inner core, a retainer ring threaded into the inner core and facing toward said shoulder, a radiation receiver disc, a soft metal seal engaging the periphery of said radiation receiver disc, said radiation receiver disc and said seal clamped between said shoulder and said retaining ring, an end cap threaded into the inner core and having an axially extending guide aperture for directing radiation to the receiver disc, with the diameter of said aperture less than the diameter of said shoulder and said retainer ring, means for measuring the temperature gradient on said radiation receiver radially of said radiation receiver between said aperture and said shoulder.

2. A power meter comprising a flat surface exposed to radiation formed by edges of a plurality of stacked flat plates, a plurality of first electrical conductors formed of a first metal with each of said conductors having a first end portion and a second end portion, said first electrical conductors being mounted uniformly on said flat plates so that said first end portions lie in a row near said edges forming the surface exposed to radiation and said second end portions lie in a parallel row at a substantial distance from said edges, a plurality of second electrical conductors formed of a second metal different from said first metal with each of said second conductors electrically connected between one of said first end portions of said first conductors and one of said second end portions of a different first conductor such that the first conductors and the second conductors are alternately linked in electrical series, electrical output leads connected to opposite ends of said electrical series; a liquid cooling system formed by at least one chamber in said stacked flat plates on the side of said conductors opposite to said surface and connected to a liquid supply and liquid discharge for maintaining said plates at said rows substantially distant from said edges at a temperature substantially constant and lower than the temperature of said plates at said rows near said edges whereby an electromotive force will be generated between said output leads which is substantially unaffected by the location on said flat surface at which said radiation is incident and which can be measured to indicate the intensity of radiation incident on said flat surface.

3. A power meter for sensing incident radiation comprising a circular thermoconductive disc, a plurality of first electrical conductors formed of a first metal with each of said conductors having a first end portion and a second end portion, with said first end portions mounted on said disc and positioned uniformly around the periphery of a first circle which is concentric with said disc and with said second end portions mounted on said disc and positioned uniformly around the periphery of a second circle which is concentric with said disc and substantially larger than said first circle, a plurality of second electrical conductors formed of a second metal different from said first metal with each of said second conductors electrically connected between one of said first end portions of said first conductors and one of said second end portions of different first conductors such that the first conductors and the second conductors are alternately linked in electrical series, electrical output leads connected to opposite ends of said electrical series, an annular cooling body connected to the periphery of said disc at a location outside said second circle for maintaining the temperatures of said disc at said second circle substantially constant and lower than the temperature of said disc at said first circle whereby an electromotive force will be generated between said output leads when said disc is heated by incident radiation, a differential amplifier having first and second inputs and an output for providing an output signal responsive to the signals at said inputs, means for connecting one of said output leads to said first amplifier input, means connected to said amplifier output for indicating the output signal of said amplifier, a resistance-capacitance circuit connected between said indicating means and said remaining output lead for providing the electrical analog of the time lag in said target, voltage divider means connected across said resistance-capacitance circuit, and means for connecting a point on said divider to the second input of said amplifier.

4. A power meter for measuring the output power of lasers comprising:
   target means for absorbing the output power of lasers, said target means having a thermal propagation time lag;
   means for cooling said target means;
   thermopile means disposed to measure the gradient in said target means and having output terminals for producing an electrical signal which is a parameter of the thermal gradient in said target means;
   a differential amplifier having first and second inputs and an output for providing an output signal responsive to the signals at said inputs;
   means for connecting one of said thermopile output terminals to said first input; p1 means connected to said amplifier output for indicating the output signal of said amplifier;
   a resistance-capacitance circuit connected between said indicating means and a second output terminal of said thermopile for providing the electrical analog of the time lag in said target;
   voltage divider means connected across said resistance-capacitance circuit; and,
   means for connecting a point on said divider to the second input of said amplifier.

5. A power meter for measuring the output power of lasers comprising:
   target means for absorbing the output power of a laser, said target means having a thermal propagation time lag, wherein said target means comprises a plurality of stacked flat plates and wherein the target surface is formed by the edges of said flat plates;
   means for cooling said target means;
   thermopile means associated with each of said stacked flat plates between said cooling means and said surface for measuring the thermal gradient across each plate;
   said thermopiles connected together and having output terminals for producing an electrical signal which is a parameter of the thermal gradient in said target means;
   detecting means including an indicating means connected to said output terminals for providing the electrical analog of the time lag in said target means;
   said indicating means providing an indication of said laser output power.

6. The power meter according to claim 5 wherein said detecting means comprises a resistance-capacitance circuit having a time constant substantially equal to the time lag in said target means.